Patented Dec. 8, 1942

2,304,290

UNITED STATES PATENT OFFICE 2,304,290

ALKYLATION PROCESS

Adrianus Johannes van Peski, Amsterdam, Netherlands, assignor to Shell Development Company, San Francisco, Calif., a corporation of Delaware No Drawing. Application January 2, 1940, Serial No. 312,186. In the Netherlands December 16, 1938

9 Claims. (Cl. 196—10)

This invention relates to the manufacture of motor fuels of improved quality and deals with a method for producing saturated hydrocarbons of high anti-knock value eminently suitable for use as such a fuel or as a valuable blending agent for improving the combustion characteristics of other hydrocarbons. The invention is particularly concerned with the production of saturated hydrocarbons of branched chain structure from unsaturated hydrocarbons and more especially the alkylation of saturated hydrocarbons.

In spite of the extensive studies which for years have been made of alkylation reactions in the presence of Friedel-Crafts type catalyst, no practical method of applying these reactions to the manufacture of motor fuels has appeared. For example, it has been proposed to produce gasoline boiling hydrocarbons by alkylation of isobutane with normally gaseous olefines in the presence of aluminum chloride, but the high consumption of catalyst, large amounts of undesirable higher boiling products and difficulties of control of the reaction, particularly difficulties of proportioning reactants and catalyst and maintaining uniform, smooth reaction have interfered with the commercial application of such suggestions.

It is an object of the present invention to provide a commercially practical method for alkylating aliphatic saturated hydrocarbons in the presence of catalysts of the Friedel-Crafts type, particularly a process whereby the difficulties of control in large scale operation may be avoided. Another object is to reduce the apparatus and operating expenses involved in such alkylations. Still another object is to more completely utilize cracking gases in the preparation of liquid hydrocarbons. A further object is to obviate the difficulties attendant on the usual shortage of isoparaffins compared with olefinic hydrocarbons in cracking products.

The process of the invention is based upon the discovery that saturated aliphatic hydrocarbons may be more advantageously alkylated in the presence of Friedel-Crafts catalysts by reaction with olefinic polymers instead of the olefines themselves. Most preferably highly viscous polymers of aliphatic character are used. Such polymers may be prepared for example, by treatment of olefines, diolefines, or mixtures comprising such polymerizable compounds with aluminum halides, boron fluoride, or the like. Preferably low temperature polymerization under conditions at which high molecular polymers, most preferably polymers boiling above the gasoline boiling range, is used. United States Patents 2,019,772, 2,055,415, 2,076,201, 2,085,524 and 2,117,498, for example, describe polymerization process which may advantageously be used in preparing polymers which may be employed in the process of the invention. While such higher molecular products of complex structure are preferred, other polymers of aliphatic character may also be used. Thus suitable polymers obtained by treating olefines with phosphoric or sulphuric acid and like polymerization agents may be employed. It may be feasible in some cases to utilize polymerization products prepared by suitable non-catalytic methods. The polymers may be used as crude mixtures with or without unpolymerized olefines or other starting materials or suitable fractions of the polymerization product such as may be obtained by distillation and/or extraction with suitable solvents, e. g. by the process of U. S. Patent 2,099,513, may be used.

Examples of olefinic compounds which may be employed as starting material are mono-olefines, such as ethylene, propylene, alpha and beta butylenes, isobutylene, cyclopentene, and higher homologues thereof, diolefines, as butadiene, cyclohexadiene, etc. Especially suitable starting materials are the gases containing mixtures of these compounds obtained in cracking petroleum hydrocarbons although olefinic compounds or mixtures thereof prepared in other ways such, for example, as dehydration of alcohols particularly alcohol mixtures obtainable by the hydrogenation of carbon oxides or dehydrohalogenation of suitable mono- or poly-halides may also be used.

Saturated aliphatic hydrocarbons which may be alkylated by the process of the invention include, for example, normal and isobutane, normal and isopentane and the like. As is the case with the starting olefines, the saturated hydrocarbon used may be applied in the form of mixtures as well as individual compounds and other components not interfering with the desired reaction may also be present. Paraffins derived from natural gas are particularly useful in process, as are also the residual saturated hydrocarbons remaining after preparation of the olefine polymers being employed. Hydrogenated cracking products or saturated hydrocarbons produced by isomerization, rearrangement or reforming suitable hydrocarbon compounds or mixtures may also be used as starting material for the process.

Catalysts which may be used in the alkylation step of the invention are the metal halides and organic metal halide compounds or complexes which are effective in promoting Friedel-Crafts syntheses, such catalysts being referred to generically as metal halide alkylation catalysts. The metal halides which may be used include, for example, aluminum chloride, aluminum bromide, aluminum fluoride, antimony chloride ($SbCl_5$), beryllium chloride, boron trifluoride, stannic chloride, tantalum bromide, tungsten chloride and the like. Compounds formed by the union of heavy metal halides with hydrocarbons whereby organo-metallic catalysts of the type $RAlX_2$ and $R_2AlX$, where R is an alkyl radical and X is a halogen, particularly chlorine or bromine, may also be used for example, as may also double salts such as $AlCl_3.CuCl$, $(AlCl_3)_2.SnCl_2$, $AlCl_3.NiCl_2$, $(AlCl_3)_2.NiCl_2$, $AlCl_3.CoCl_2$ and the like. Double salts of aluminum halides with cobalt halides are particularly useful in view of their long catalyst life. Mixtures of two or more catalysts may be used, in fact, it is generally preferred to use the organic type catalysts in conjunction with a suitable metal halide. The catalysts are preferably employed together with suitable activators for the desired reaction, such as the hydrogen halides and alkyl halides, most preferably those containing halogen corresponding to the metal halide alkylation catalyst used. Thus, for example, with aluminum chloride, alkyl chloride or more preferably hydrogen chloride may be used as an activator, while hydrogen fluoride is preferably used with aluminum fluoride and boron fluoride alkylation catalysts. Instead of adding the hydrogen halide activator directly it may be formed in situ by reaction of the metal halide with water. The alkylation catalyst may be advantageously deposited on a suitable porous carrier or the like, such for example, as activated carbon, silica gel, etc. or more preferably activated alumina.

The conditions which will be found to be most advantageous for carrying the alkylation in any specific case will depend upon the paraffin or paraffins being alkylated, the nature of the polymer used both as regards the nature of the olefinic starting material and the method and degree of polymerization, the catalyst chosen and the alkylation product which it is desired to produce. Important operating variables which may be controlled in order to promote favorable yields of a desired alkylation product or mixture of products include the temperature and time of alkylation, the proportion of reactive paraffin to polymer, the ratio of catalyst to polymer, the amount of catalyst activator used and the concentration of reactants in the reaction mixture as well as the degree of contact of reactants, although as regards the latter it is generally preferable to operate under conditions at which the most uniform and intimate mixing of reactants practicable is maintained.

The alkylation process of the invention may generally be carried out advantageously in the temperature range of about $-50°$ C. to about $+150°$ C. although temperatures between about $0°$ C. and about $100°$ C. are preferred. More drastic reaction conditions are desirable in the alkylation of paraffins of straight chain character than are preferred with the corresponding isoparaffins and advantage may be taken of this fact to effect selective alkylation of the more reactive tertiary paraffin content of paraffin mixtures whereby substantially pure normal paraffins may be obtained from the unreacted hydrocarbon. The process may be carried out at ordinary or superatmospheric pressure and preferably conditions are used at which all the reactants are in the liquid phase. The reaction temperature and time are, within limits, compensating factors, higher temperatures being preferably used for shorter times. For example, in the alkylation of isobutane using an aluminum chloride polymerization product of propylene boiling mainly above $300°$ C. with an aluminum chloride catalyst activated with HCl two hours reaction at $80°$ C. was found to be approximately equal in batch operation to six hours at $20°$ C. and to be better than two hours at $60°$ C. or four hours at $80°$ C.

The alkylation is promoted by the use of a stoichiometric excess of butanes or pentanes, such excess being calculated from the number of mols of unsaturated starting material present in the polymer being used. Where an isoparaffin is being selectively alkylated in the presence of a normal paraffin, a molecular excess of such isoparaffin is preferably provided. Preferably at least 1.1 and more preferably two or more mols of reactive paraffin are used per mol of starting olefine in the polymer. High ratios of isoparaffin to polymer favor high yields of isoparaffinic alkylation products boiling in the gasoline range.

High proportions of catalyst to reactants also promote high yields of gasoline as does also the use of high proportions of catalyst activator. Between about 5 and about 75% by weight of metal halide alkylation catalyst calculated as metal halide based on polymer may be used. In the alkylation of isobutane with viscous polymers produced by aluminum chloride polymerization of propylene, for example, between about 5 and about 40% of aluminum chloride has been found to be advantageous. With less active catalysts higher proportions may be advantageously used. The proportion of activator may vary widely. Proportions between about 1% and about 100% of the weight of catalyst used calculated as hydrogen halide based on metal halide are suitable, the best proportion depending upon the nature of the catalyst and activator chosen. Good results may usually be obtained by saturating the hydrocarbon feed or preferably the paraffin hydrocarbon feed to the reactor with hydrogen halide at the reaction temperature. Adequate proportions of activator and paraffin are desirable in order to insure good quality of product and long catalyst life, particularly by restraining undesirable side reactions such as dehydrogenation and the like leading to the formation of aromatic compounds which interfere with the alkylation power of the catalyst.

The invention may be carried out in many ways. One simple method of batch operation comprises vigorously stirring a reaction mixture of the paraffin and the polymer in the presence of the required amount of metal halide alkylation catalyst and activator therefor at a suitable reaction temperature. After sufficient reaction the mixture may be stratified and the product-containing hydrocarbon layer drawn off. The catalyst layer may then be reused for further reaction, if necessary after fortification with fresh catalyst. It is a feature of the process of the invention that catalyst which has lost part or all of its capacity for promoting the desired alkylation may advantageously be used for the preparation of the polymers employed in the alkylation step. In this manner the consumption of catalyst may be greatly reduced through avoidance of any extra charge for polymerization catalyst and at the same time hydrocarbon extractable components of the spent alkylation catalyst are recovered therefrom with the polymer in the polymerization treatment.

The foregoing batch procedure may be made continuous by continuously feeding in reactants while drawing off reacted mixture to a separate vessel for stratification. An alternative form of continuous reactor comprises a tubular or other suitably shaped reactor through which the reaction mixture may be pumped at a rate sufficient to provide the degree of turbulence required for maintaining the necessary intimate contact of the reactants or which may be equipped with suitable stirring devices, baffles, etc. for maintaining such contact throughout the reactor. With such equipment a suspension of the chosen catalyst in one of the reactants may be pumped in while a mixture of the other reactant with the catalyst activating agent is separately introduced. At the other end of the reactor the reacted mixture may be drawn off for settling. It may be advantageous to draw off only a part of the emulsified reaction mixture for settling and to continuously recirculate reacted mixture for mixing with the feed as rapid intimate mixing of the reactants is promoted thereby. The hydrocarbon phase of the stratified reaction mixture may be scrubbed with a caustic soda solution to remove any remaining catalyst and fractionated to separate a water-white gasoline with a bromine number equal to or substantially zero and wholly or substantially consisting of isoparaffins.

It is an advantage of the invention that more accurate control of the reaction may be achieved through more uniform proportioning of catalyst to the other reactants by using the polymer to be reacted as a carrier for the catalyst. Thus a preferred procedure comprises forming a mixture or paste of the catalyst with a high molecular, viscous polymer and feeding such mixture into the reactor to there contact the paraffin to be alkylated and the chosen catalyst activator. Such mixtures, which may advantageously be prepared in a paint mill or the like, remain homogeneous for a long time so that the clogging of conduits and valves with catalyst such as frequently occurs when the catalyst is added directly or in suspension in less viscous reactants is avoided. Moreover, at ordinary temperatures in the absence of catalyst activators no reaction occurs between the catalyst and polymer whereas such reaction takes place readily with carrier oils which are not purely aliphatic such as viscous mineral oil fractions containing undesirable cyclic hydrocarbons. Long catalyst life as well as more accurate control of the alkylation are achieved by avoiding such undesired reactions.

The following examples are given as illustrative of the type of results which may be obtained by the process of the invention.

*Example I*

230 g. of a mixture of 88% isobutane and 12% n-butane, 171 g. of a highly viscous oil obtained by polymerization of propylene at 0° C. with AlCl₃ as catalyst, 25 g. AlCl₃ and 5 g. HCl were introduced into a 1 litre autoclave.

The mixture was heated for 1 hour to 80° C., whereupon the autoclave was rotated for two hours at the same temperature.

The reaction product, after being decanted from the sludge (44 g.) and after a treatment with dilute alkali consisted of 187 g. of a clear liquid, 75 g. of which boiled between about 36 and 146° C. had a bromine figure below 0.5 and consisted practically entirely of isoparaffins, whilst the remainder was practically unchanged propylene polymerisate.

*Example II*

A fraction of cracking gases substantially consisting of hydrocarbons having four carbon atoms per molecule was subjected to a polymerization treatment such as described in U. S. Patent 2,174,247 whereby a residual gas consisting of about 25% normal butylene and 75% of butanes, preponderantly normal butanes, was obtained. In order to utilize the butylene content of this gas for alkylation of isobutane a large apparatus was required on account of the large amount of diluent n-butane present. This could be avoided by first converting the butylene to polymers from which n-butane was easily separated. To this end the residual gas was treated during some hours in the liquid phase at 0° C. in an autoclave with 1% AlCl₃. The resulting polymerisate was then fractionated into a portion boiling below 160° C. (a gasoline) and a portion boiling above 160° C. Of the latter 75 parts by weight were subsequently treated with 250 parts by weight of a mixture of 80% isobutane and 20% n-butane during 2 hours at 80° C. with 5 parts by weight HCl and 20 parts by weight AlCl₃ in a reaction vessel arranged for agitation of the reactants and for operation under pressure.

The reaction product consisted, after removal of the sludge and treatment with caustic solution of 80 parts by weight of a clear liquid, 45 parts by weight of which boiled between about 30 and 170° C. and consisted almost completely of isoparaffins. Moreover, an amount of residual gas was collected, which contained about 35 parts by weight of isopentane and other highly volatile paraffins.

*Example III*

A paste consisting of equal parts by weight of technical aluminum chloride and viscous polymers prepared by treating a propane-propylene fraction with AlCl₃ at 0° C. was charged to a horizontal rotating stainless steel reactor provided with stirring elements, together with an additional amount of the same polymer. Normal butane and hydrochloric acid were also fed in. The proportion of reactants being 5 parts by weight of AlCl₃ per part of HCl, 7 parts by weight of polymer per part of AlCl₃ and 1⅓ parts by weight of butane per part of polymer.

After two hours reaction at 60° C. a hydrocarbon layer equivalent to about 81% by weight of the polymer charge was recovered from the stratified reaction product. From this 17% of a gasoline of 200° end point could be recovered. The remainder could be used for alkylating isobutane in accordance with Example I.

The process of the invention is capable of many modifications. Thus instead of reacting the polymer first with normal and then with isoparaffin as represented by the procedure when the processes of Examples I and II are used together, the reverse order of operations may be employed. This offers advantages especially when higher temperatures are used for the reaction of the residual polymer from the isoparaffin alkylation with normal paraffin. Whichever procedure is employed normal paraffin for the normal paraffin alkylation may be advantageously obtained from the residual gases from the isoparaffin alkylation by suitable fractionation, thus reducing the amount of diluent paraffin in the isoparaffin reactor introduced by recycling unreacted gases to the alkylation unit. Also instead of using only fresh catalyst in each stage of such a multi-stage process, catalyst from the separator of one stage may be used in one or more of the other stages with or without additional catalyst. For example, the unreacted polymer in the heavy ends obtained by distilling of the desired gasoline fraction from a stabilized alkylate may be admixed with the alkylation catalyst and so serve as the catalyst carrier instead of the initial polymer. Instead of feeding such mixture back to the same reactor it may be used to alkylate the same or another suitable paraffin in another alkylator. Still other modifications of the invention may be made. For example, not only is it feasible to add unpolymerized olefine during the alkylation with polymers but also it is sometimes advantageous to feed in other materials. Thus where double salt catalysts are used, particularly those of the type of $AlCl_3.NiCl_2$ and the like, the presence of hydrogen has been found to be beneficial.

The invention offers many advantages. Not only does it overcome the former difficulties of alkylation with metal halide catalysts but also it may be used to prepare new and superior products. For example, premium grade aviation gasoline may be produced from cracking gases as the only source of hydrocarbons. Thus, using the procedure of Example II for instance, the polymers boiling in the gasoline range may be hydrogenated and the hydrogenation product combined with the products of gasoline boiling range formed in the alkylation step and the volatility of the mixture adjusted by blending therewith a suitable proportion of the pentanes which are very largely isopentane, also formed in the alkylation as well as a suitable amount of butane from the unreacted hydrocarbons from the process. In this way a substantially isoparaffinic gasoline having a substantially smooth distillation curve and an unusually high lead susceptibility may be readily obtained. If desired other hydrocarbons or fractions, such for example, as straight run gasolines or the like may be used as components in place of or in addition to the hydrogenated polymer gasoline.

*Example IV*

277 g. of a mixture of 88% isobutane and 12% n-butane, 113 g. of an ethylene polymerisate, 20 g. aluminium chloride and 7 g. hydrochloric acid were introduced into an autoclave of 1 litre capacity. The ethylene polymerisate had been obtained by treating ethylene at 20–60° C. with a nickel-aluminum chloride catalyst under a pressure of about 70 atmospheres. The polymerisate was of the nature of a lubricating oil.

The mixture was rotated for 2 hours at 60° C.; after removal of the sludge and a treatment with dilute lye the reaction product consisted of 105 g. of a clear liquid, 33% by volume of which consisted of a gasoline boiling up to 175° C. and containing practically only isoparaffins.

While the process has been described in detail in order to make its nature and commercial value clear, the invention is not limited to the exact details disclosed nor by any theory advanced in explanation of the improved results obtained.

I claim as my invention:

1. A process for producing isoparaffins boiling in the gasoline range from isobutane and propylene which comprises treating a propane-propylene fraction with aluminum chloride under conditions at which liquid propylene polymers boiling above the gasoline range are formed, separating said polymers from other hydrocarbon components of the reacted mixture, intimately contacting at least a part of the separated polymer with isobutane in the liquid phase, containing admixed hydrogen chloride in the presence of aluminum chloride at a temperature within the range of 0° to 100° C. at which alkylation of isobutane takes place with formation of gasoline boiling isoparaffins, separating from the reaction mixture higher boiling hydrocarbon containing unreacted polymer and aluminum chloride, supplying at least a part of the latter to the propylene polymerization stage and suspending aluminum chloride in at least a part of said separated higher boiling hydrocarbon and feeding the resulting suspension to said isobutane alkylation stage.

2. A process for producing isoparaffins boiling in the gasoline range from isobutane and an olefine having less than four carbon atoms per molecule which comprises treating hydrocarbon containing said olefine with aluminum chloride under conditions at which liquid polymers of said olefine boiling above the gasoline range are formed, separating said polymers from other hydrocarbon components of the reacted mixture, forming a paste of at least a part of the separated polymer and aluminum chloride, intimately contacting with isobutane in the liquid phase containing admixed hydrogen chloride with said aluminum chloride paste at a temperature within the range of 0° to 100° C. at which alkylation of isobutane takes place with formation of gasoline boiling isoparaffins, separating aluminum chloride of substantially impaired alkylation capacity from the reaction mixture and employing at least a part of said separated aluminum chloride for effecting said polymerization.

3. A process for producing isoparaffins boiling in the gasoline range from isobutane and an olefine having less than four carbon atoms per molecule which comprises polymerizing said olefine in the presence of aluminum chloride intimately contacting a suspension of aluminum chloride in at least a part of the resulting polymer with isobutane in the liquid phase containing admixed hydrogen chloride at a temperature within the range of 0° to 100° C. at which alkylation of isobutane takes place with formation of gasoline boiling isoparaffins, separating aluminum chloride from the reaction mixture and employing at least a part thereof in the preparation of said polymer.

4. A process for producing an isoparaffin boiling in the gasoline range by alkylation of an isoparaffin having less than six carbon atoms per molecule which comprises intimately contacting a suspension of aluminum chloride in an aliphatic olefine polymer boiling above the gasoline range with said isoparaffin in the presence of an effective amount of hydrogen chloride at a temperature within the range of —50° C. to 100° C. at which alkylation of said isoparaffin takes place with formation of gasoline boiling isoparaffins, separating from the reaction mixture higher boiling hydrocarbon containing unreacted polymer, and reacting said separated polymer in the presence of a normal paraffin and aluminum chloride at a temperature within the range of 0° C. to 150° C. at which additional isoparaffin boiling within the gasoline range is formed.

5. A process for producing an isoparaffin boiling in the gasoline range by alkylation of an isoparaffin having less than six carbon atoms per molecule which comprises intimately contacting a suspension of a metal halide alkylation catalyst in an aliphatic olefine polymer boiling above the gasoline range with said isoparaffin in the presence of the corresponding hydrogen halide at a temperature within the range of about −50° C. to 150° C. at which alkylation of said isoparaffin takes place with formation of gasoline boiling isoparaffins, separating higher boiling hydrocarbon from said alkylation product and reacting it with a paraffin of less than six carbon atoms per molecule in the presence of a hydrogen halide-activated metal halide alkylation catalyst at a higher temperature within the range of 0° C. to about 150° C. than used in the first said alkylation.

6. A process for producing an isoparaffin boiling in the gasoline range by alkylation of a paraffin having less than six carbon atoms per molecule which comprises contacting an olefine and a substantial molecular excess of said paraffin with a suspension of a metal halide alkylation catalyst in an aliphatic olefine polymer boiling above the gasoline range at about −50° C. to 150° C. in the presence of a hydrogen halide, separating gasoline boiling isoparaffins and higher boiling hydrocarbons from the resulting hydrocarbon mixture, and suspending said metal halide in the latter to form alkylation catalyst for further alkylation of said paraffin.

7. A process for producing an isoparaffin boiling in the gasoline range which comprises contacting a suspension of a metal halide alkylation catalyst in an aliphatic olefine polymer boiling above the gasoline range with a substantial stoichiometric excess of an isoparaffin having less than six carbon atoms per molecule and a hydrogen halide at a temperature within the range of about −50° C. to about 100° C. at which alkylation of said isoparaffin takes place with the formation of gasoline boiling isoparaffins, separating higher boiling unsaturated hydrocarbons from said alkylation product, suspending said metal halide catalyst in the separated higher boiling hydrocarbon, and contacting the resulting suspension with a paraffin under alkylation conditions.

8. A process for producing an isoparaffin boiling in the gasoline range which comprises contacting a suspension of a metal halide alkylation catalyst in an aliphatic olefine polymer boiling above the gasoline range with a substantial stoichiometric excess of an isoparaffin having less than six carbon atoms per molecule and a hydrogen halide at a temperature within the range of about −50° C. to about 100° C. at which alkylation of said isoparaffin takes place with the formation of gasoline boiling isoparaffins, separating from the reaction mixture a suspension of said catalyst in higher boiling polymers, and contacting the separated suspension with a normal paraffin at a higher temperature within the range of 0° C. to about 150° C. at which alkylation of said normal paraffin takes place.

9. A process of producing hydrocarbons boiling within the gasoline range from lower boiling paraffins and olefines which comprises contacting said hydrocarbon with aluminum chloride under conditions at which polymerization of olefine takes place and polymers boiling above and below about 160° C. are formed, removing paraffin from the polymerization products, separating polymers boiling below about 160° C. and submitting them to hydrogenation, suspending aluminum chloride in the separated polymers boiling above about 160° C., and contacting isoparaffin with the suspension under alkylating conditions, and mixing at least a part of the paraffin removed from the polymerization products with said alkylation and hydrogenation products.

ADRIANUS JOHANNES van PESKI.